United States Patent
Haufler

(10) Patent No.: US 9,946,269 B2
(45) Date of Patent: Apr. 17, 2018

(54) METHOD FOR OPERATING A SWITCH VALVE THAT OPENS AND CLOSES A FLUID LINE FED BY A FILTER AND FEEDING AN INTAKE PIPE

(71) Applicant: Continental Automotive GmbH, Hannover (DE)

(72) Inventor: Roland Haufler, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 211 days.

(21) Appl. No.: 14/772,342

(22) PCT Filed: Feb. 17, 2014

(86) PCT No.: PCT/EP2014/053000
§ 371 (c)(1),
(2) Date: Sep. 2, 2015

(87) PCT Pub. No.: WO2014/139760
PCT Pub. Date: Sep. 18, 2014

(65) Prior Publication Data
US 2015/0378368 A1 Dec. 31, 2015

(30) Foreign Application Priority Data
Mar. 13, 2013 (DE) .......... 10 2013 204 389

(51) Int. Cl.
*G05D 7/00* (2006.01)
*G05D 9/00* (2006.01)
(Continued)

(52) U.S. Cl.
CPC ..... *G05D 7/0635* (2013.01); *B60K 15/03519* (2013.01); *F02D 41/004* (2013.01);
(Continued)

(58) Field of Classification Search
CPC ..................................................... G05D 7/0635
(Continued)

(56) References Cited

U.S. PATENT DOCUMENTS

| 4,535,879 | A | * | 8/1985 | Sturges | F16D 48/066 |
| | | | | | 192/109 F |
| 5,425,349 | A | * | 6/1995 | Nagaishi | F02D 41/0045 |
| | | | | | 123/520 |

(Continued)

FOREIGN PATENT DOCUMENTS

| CN | 85104625 A | 12/1986 | ......... F02D 41/00 |
| DE | 10065122 A1 | 8/2002 | ......... F02D 11/10 |

(Continued)

OTHER PUBLICATIONS

Wolfgang Fuchs, English translation of DE10155363 A1, dated May 22, 2003, pp. 3.*

(Continued)

*Primary Examiner* — Suresh Suryawanshi
(74) *Attorney, Agent, or Firm* — Slayden Grubert Beard PLLC

(57) ABSTRACT

A method for operating a switch valve which opens and closes a fluid line is disclosed. The switch valve is actuated by a pulse width modulated signal. The switch valve is actuated outside of the active operating time of the switch valve using PWM signals with an increasing or decreasing duty cycle. The duty cycle in which the switch valve is opened is determined, and the duty cycle corresponding to the opening time is then used to actuate the switch valve to open and close the switch valve during the active operating time of same. In this manner, the switch valve can be actuated in a particularly precise manner.

12 Claims, 2 Drawing Sheets

(51) Int. Cl.

| | | |
|---|---|---|
| *F02M 33/02* | (2006.01) | |
| *G05D 7/06* | (2006.01) | |
| *F02M 25/08* | (2006.01) | |
| *F02D 41/00* | (2006.01) | |
| *F02D 41/24* | (2006.01) | |
| *B60K 15/035* | (2006.01) | |
| *F16K 24/04* | (2006.01) | |
| *G05B 15/02* | (2006.01) | |
| *F02D 41/20* | (2006.01) | |
| *B60K 15/03* | (2006.01) | |

(52) U.S. Cl.
 CPC ..... *F02D 41/2464* (2013.01); *F02M 25/0836* (2013.01); *F16K 24/04* (2013.01); *G05B 15/02* (2013.01); *B60K 2015/0321* (2013.01); *B60K 2015/03236* (2013.01); *B60K 2015/03256* (2013.01); *B60K 2015/03542* (2013.01); *B60K 2015/03585* (2013.01); *F02D 2041/2017* (2013.01); *F02D 2041/2055* (2013.01); *F02D 2200/0406* (2013.01); *F02M 25/089* (2013.01)

(58) Field of Classification Search
 USPC ....................................................... 700/282
 See application file for complete search history.

(56) References Cited

U.S. PATENT DOCUMENTS

| | | | | |
|---|---|---|---|---|
| 6,886,399 B2* | 5/2005 | Schnaibel | ............. | F02D 11/106 |
| | | | | 73/114.33 |
| 7,047,798 B2* | 5/2006 | Esteghlal | ............. | F02D 41/003 |
| | | | | 73/114.38 |
| 8,041,496 B2* | 10/2011 | Eser | ................... | F02M 25/0809 |
| | | | | 123/520 |
| 8,584,654 B2* | 11/2013 | Closet | ................ | F02M 25/0809 |
| | | | | 123/520 |

FOREIGN PATENT DOCUMENTS

| | | | | |
|---|---|---|---|---|
| DE | 10150420 A1 | 4/2003 | ............. | F02M 25/08 |
| DE | 10155363 A1 | 5/2003 | ............. | F02D 41/00 |
| DE | 10323869 A1 | 12/2004 | ........... | B60K 15/035 |
| DE | 102004022999 B3 | 12/2005 | ........... | B60K 15/035 |
| DE | 102008030089 A1 | 1/2010 | ............. | F02M 25/08 |
| JP | 0610780 B | 2/1994 | ............... | G05F 5/00 |
| WO | 02/20962 A1 | 3/2002 | ............. | F02D 41/00 |
| WO | 2014/139760 A1 | 9/2014 | ............. | F02D 41/00 |

OTHER PUBLICATIONS

Korean Office Action, Application No. 2017002896997, 7 pages, dated Jan. 12, 2017.

German Office Action, Application No. 102013204389.9, 5 pages, dated Jul. 4, 2013.

International Search Report and Written Opinion, Application No. PCT/EP2014/053000, 18 pages, dated May 12, 2014.

Chinese Office Action, Application No. 201480014503.2, 13 pages, dated Mar. 28, 2017.

Korean Office Action, Application No. 2017084775375, 7 pages, dated Dec. 4, 2017.

* cited by examiner

METHOD FOR OPERATING A SWITCH VALVE THAT OPENS AND CLOSES A FLUID LINE FED BY A FILTER AND FEEDING AN INTAKE PIPE

CROSS-REFERENCE TO RELATED APPLICATIONS

This application is a U.S. National Stage Application of International Application No. PCT/EP2014/053000 filed Feb. 17, 2014, which designates the United States of America, and claims priority to DE Application No. 10 2013 204 389.9 filed Mar. 13, 2013, the contents of which are hereby incorporated by reference in their entirety.

TECHNICAL FIELD

The present invention relates to a method for operating a switch valve which opens and closes a fluid line and which is actuated by means of a pulse-width-modulated (PWM) signal in order to open and close a control device.

BACKGROUND

Switch valves of this kind are distinguished by a particularly simple design since they are moved by control only between two switching states, specifically fully open or fully closed. Therefore, the switch valve does not assume any intermediate positions.

The switch valves are actuated by means of a pulse-width-modulated (PWM) signal. This signal is defined by the control device on the basis of various setpoint values of corresponding operating parameters. However, there is a risk in this case of deviations in the corresponding actual values from the setpoint values, for example due to component tolerances, operating tolerances etc., giving rise to faults which cause the opening time of the switch valve to be incorrectly determined. When, for example, the aim is to achieve a desired fluid throughflow rate using the switch valve, a value which differs from said desired fluid throughflow rate results in reality.

These problems will be explained using a conventional tank venting system. A system of this kind has an activated carbon filter which binds hydrocarbons which are outgassed from the tank. A flushing line leads from the activated carbon filter, via a tank venting valve, into the intake pipe of the associated engine. The tank venting valve is an above-described switch valve which is driven by the engine controller by means of a pulse-width-modulated (PWM) signal and controls the flow of gas from the activated carbon filter to the intake pipe. This valve is actuated, for example, at a frequency of between 5 and 35 Hz.

The associated engine controller determines, amongst other things, a setpoint value for the flushing flow, and furthermore the intake pipe pressure with the aid of a pressure sensor, for the current operating state. A PWM value for actuating the tank venting valve is determined from the pressure gradient between ambient pressure and intake pipe pressure and from the prespecified flushing flow. The abovementioned distortions can also occur in this case.

For the purpose of eliminating the abovementioned problems, it is known to adjust the opening point in order to thereby match the opening point of the switch valve to the actually existing conditions. Adjusting the opening point in this way has been carried out in the above-described tank venting system in the case of a fully loaded activated carbon filter by interpreting the lambda deviation by slowly opening the switch valve during a stationary operating phase of the engine. Disadvantages of this method are:
1. said method is possible only when the activated carbon filter is full,
2. said method is possible only during relatively long stationary operating phases of the engine,
3. there are no other disturbing influences on the lambda controller.

Furthermore, it is known to evaluate the corresponding current signal in order to carry out opening point detection in switch valves. However, additional costs for a current sensor are incurred in this case.

SUMMARY

One embodiment provides a method for operating a switch valve which opens and closes a fluid line and which is actuated by means of a pulse-width-modulated signal in order to open and close a control device, said method comprising the following steps: actuating the switch valve outside the active operating time of said switch valve using PWM signals with an increasing or decreasing duty cycle; determining the duty cycle in which the switch valve opens; and using the duty cycle which corresponds to the opening time of the switch valve as the duty cycle for actuating the switch valve in order to open and close said switch valve during the active operating time of said switch valve.

In a further embodiment, the switch valve is a tank venting valve which controls the flow of gas from a filter of the tank to the intake pipe of the engine of a motor vehicle.

In a further embodiment, the duty cycle which corresponds to the opening time is stored after it is determined.

In a further embodiment, opening of the switch valve is determined by pulse detection.

In a further embodiment, opening of the switch valve is determined by an increase in the intake pipe pressure.

In a further embodiment, correction factors, e.g., based on pressure difference, battery voltage and/or temperature, are taken into account when determining the duty cycle for actuating the switch valve.

BRIEF DESCRIPTION OF THE DRAWINGS

Example embodiments are discussed below with reference to the drawings, in which.

DETAILED DESCRIPTION

Figure 1:
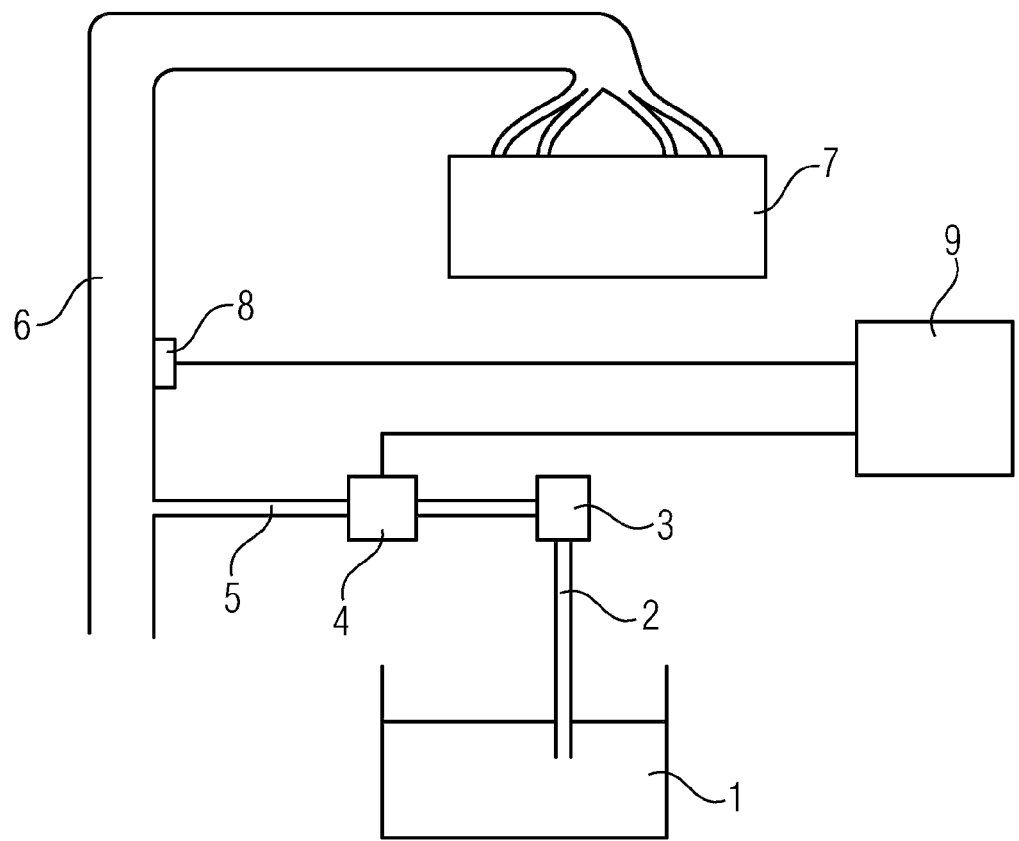
FIG. 1 is a schematic illustration of a tank venting system.

Embodiments of the invention provide a method of actuating a switch valve in a simple and particularly accurate manner. For example, the method should allow the opening point deviation caused by component tolerances to be graded.

One embodiment provides a method comprising the following steps:
actuating the switch valve outside the active operating time of said switch valve using PWM signals with an increasing or decreasing duty cycle;

determining the duty cycle in which the switch valve opens; and using the duty cycle which corresponds to the opening time of the switch valve as the duty cycle for actuating the switch valve in order to open and close said switch valve during the active operating time of said switch valve.

Influencing factors which produce the abovementioned deviations or distortions and are the cause of the delay time of the switch valve are mainly the mechanical and electrical component tolerances, for example coil resistance, spring constant, mechanical friction of the valve seat. These influencing factors influence the electrical energy which has to be applied in order to open the valve.

At a relatively high actuating frequency which lies considerably above the valve specification (for example 250 Hz), the valves can no longer mechanically follow the actuating signal on account of the inductance and the mechanical inertia. Since the coil can no longer fully reduce the magnetic energy in accordance with the individual PWM pulses at this frequency, the magnetic energy is integrated starting from a specific duty cycle, and therefore the valve opens completely. Below this threshold, there is not enough energy to overcome the spring force. The valve remains closed.

A high actuating frequency of this kind may be used in the disclosed method, and therefore the valve remains completely open. A corresponding frequency range is therefore selected.

The supplied power with which the valve just opens can be set relatively accurately by varying the duty cycle.

Embodiments of the invention make use of this and makes provision for the valve to be acted on by a PWM signal with an increasing or decreasing duty cycle outside the active operating time of a switch valve, for example before the valve is commissioned, and for that duty cycle which corresponds to the opening point of the switch valve to be determined. The threshold of the duty cycle in which the valve opens is therefore used to indicate the opening point. The threshold of the duty cycle is dependent on the same factors as the opening point in the case of slow clocking. In other words, a valve with a late opening point requires a higher duty cycle than a valve with an early opening point.

If the valve is actuated using a pulsed PWM signal with an increasing or decreasing duty cycle, the valve opens completely starting from a specific threshold of the duty cycle.

The duty cycle which corresponds to the opening time of the switch valve is then used to actuate the switch valve in order to open and close said switch valve during the active operating time of said switch valve. In the active operating phase of the switch valve, said switch valve is therefore actuated using a signal which produces an opening point of the valve which is suited to the actual conditions (taking into account component tolerances etc.).

Embodiments may be used, for example, in a switch valve which is a tank venting valve which controls the flow of gas from a filter of the tank to the intake pipe of the engine of a motor vehicle. In this case, the disclosed method allows grading of the opening point deviation, which is caused by component tolerances, when the filter (activated carbon filter) is empty during idling. In this case, the vehicle can be correspondingly prepared, for example, at the end of the assembly line (during production) or in a garage.

In one embodiment, the duty cycle in which the switch valve opens is stored after said duty cycle has been determined, so that said duty cycle can then be used to actuate the switch valve during the active operating time of said switch valve. This ensures that the control device employs the duty cycle which corresponds to the correct opening time during active operation of the switch valve.

In one embodiment, opening of the switch valve is preferably determined by an increase in the intake pipe pressure. The intake pipe pressure is therefore determined with the aid of a pressure sensor while the switch valve is actuated using a PWM signal with an increasing or decreasing duty cycle. That duty cycle with which the intake pipe pressure accordingly increases (owing to the inflow of gas as a result of the tank venting valve opening) is then determined and used as the basis for active operation.

In one embodiment, opening of the switch valve is determined by pulse detection. This is possible at a sufficiently high and stable intake pipe pressure.

Correction factors, e.g., based on pressure difference, battery voltage and/or temperature, are preferably taken into account when determining the duty cycle for actuating the switch valve.

FIG. 1 schematically shows a tank venting system of a motor vehicle. The motor vehicle has an engine 7, combustion air being supplied via the intake pipe 6 of said engine. Further constituent parts of the engine (injection system etc.) are not illustrated here. The vehicle further has a fuel tank 1 from which fuel vapors are supplied to an activated carbon filter 3 via a line 2 and absorbed from said activated carbon filter 3. These hydrocarbons which are adsorbed in the filter are introduced into the intake pipe 6 of the engine 7 via a line 5 by flushing at certain intervals by opening a tank venting valve 4, in order to be supplied to the combustion process of the engine together with the combustion air. A pressure sensor 8 by means of which the pressure prevailing in the intake pipe can be measured is arranged in the region of the intake pipe 6.

The system further has a control device 9 which can be part of an engine controller. The control device 9 controls the operation of the tank venting valve 4, which is in the form of a switch valve, between an open state and a closed state. The valve is therefore alternately opened and closed. To this end, said valve is actuated by the control device 9 using a pulse-width-modulated signal.

The method proceeds such that the control device 9 actuates the valve 4 using PWM signals with an increasing duty cycle (mark-to-space ratio) outside the active operating time of the tank venting valve 4, that is to say for example at the end of the assembly line during the production process of the associated motor vehicle. At the same time, the sensor 8 therefore measures the pressure in the intake pipe 6 and supplies corresponding pressure signals to the control device 9. The control device 9 monitors these pressure signals and determines the duty cycle in which an increase in the intake pipe pressure occurs. This increase in the intake pipe pressure corresponds to the opening point of the tank venting valve 4 (additional gas inflow into the intake pipe 6 via the line 5).

The duty cycle which is determined by the control device 9 and corresponds to the actual opening time of the tank venting valve 4 is stored and kept ready for active operation of the motor vehicle. During active operation, the tank venting valve 4 is then actuated using PWM signals with this duty cycle in order to open the valve and to flush the activated carbon filter clear.

Figure 2:
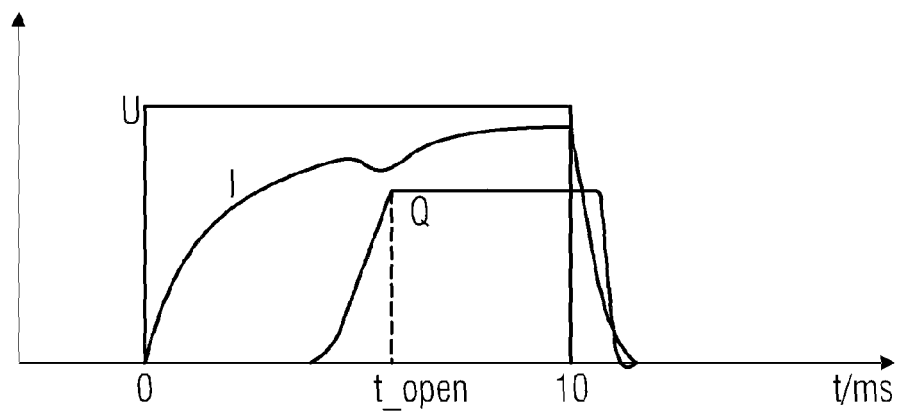
FIG. 2 is a graph which shows the current profile and valve opening profile in the case of a typical actuating pulse.

FIG. 2 shows a graph in which the current profile (I) and the valve opening profile (Q) for a typical actuating pulse (U) of 10 ms are illustrated. The opening time of the valve is identified at t_open.

Figure 3:
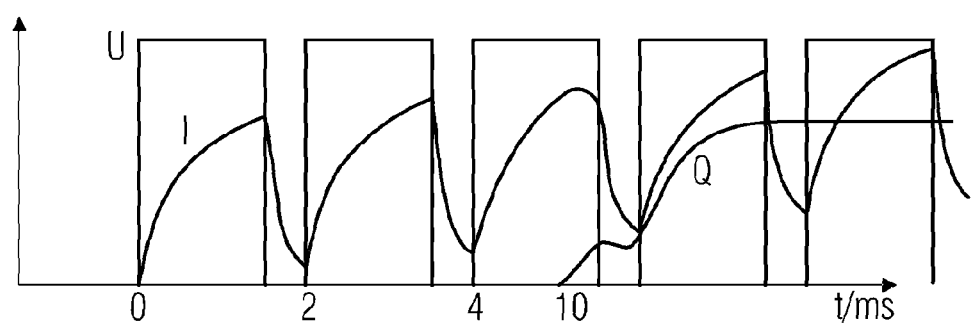
FIG. 3 is a graph which shows the voltage profile, current profile and valve opening profile in the case of a signal with a duty cycle of approximately 80%.

FIG. 3 shows a graph in which the voltage profile (U), current profile (I) and valve opening profile (Q) in the case of a signal with a duty cycle of approximately 80% and 250 Hz are illustrated.

Figure 4:
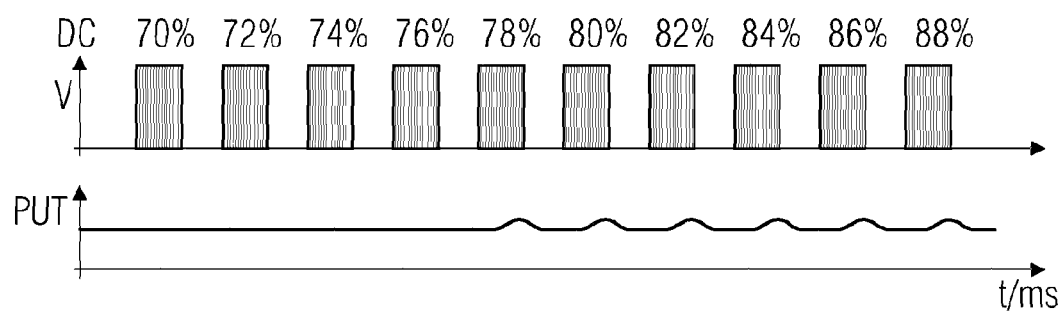
FIG. 4 is a graph which shows the signals with different duty cycles and also shows the corresponding intake pipe pressure.

FIG. 4 shows a graph in which signals with different duty cycles of 70% to 88% are illustrated in the upper part of said graph. The associated intake pipe pressure is identified in the lower part. It is clear that an increase in the intake pipe pressure, which increase corresponds to the opening time of the tank venting valve, occurs in the case of a signal with a duty cycle of 78%.

What is claimed is:

1. A method for operating a switch valve that opens and closes a fluid line fed by a filter and feeding an intake pipe and which is actuated by a pulse-width-modulated signal to open and close a control device, the method comprising:
   commissioning of the switch valve while the filter is empty, actuating the switch valve using PWM signals with an increasing or decreasing duty cycle;
   determining an opening duty cycle that causes an opening of the switch valve based on an increase in an intake pipe pressure; and
   after commissioning the switch valve, actuating the switch valve to feed the intake pipe and flush the filter using the determined opening duty cycle to open and close the switch valve during active operation of the switch valve.

2. The method of claim 1, comprising storing the determined opening duty cycle.

3. The method of claim 1, comprising determining the opening of the switch valve by pulse detection.

4. The method of claim 1, comprising actuating the switch valve based on the opening duty cycle and at least one correction factor selected from the group consisting of pressure difference, battery voltage, and temperature.

5. A control device configured to operate a switch valve that opens and closes a fluid line fed by a filter and feeding an intake pipe and which is actuated by a pulse-width-modulated signal to open and close a control device, wherein the control device is configured to:
   commissioning of the switch valve while the filter is empty, actuate the switch valve using PWM signals with an increasing or decreasing duty cycle;
   determine an opening duty cycle that causes an opening of the switch valve based on an increase in an intake pipe pressure; and
   after commissioning the switch valve, actuate the switch valve to feed the intake pipe and flush the filter using the determined opening opening duty cycle to open and close the switch valve during active operation of the switch valve.

6. The control device of claim 5, wherein the control device is further configured to store the determined opening duty cycle in a data storage device.

7. The control device of claim 5, wherein the control device is configured to determine the opening of the switch valve by pulse detection.

8. The control device of claim 5, wherein the control device is configured to actuate the switch valve based on the opening duty cycle and at least one correction factor selected from the group consisting of pressure difference, battery voltage, and temperature.

9. A tank venting system for a motor vehicle, the tank venting system comprising:
   a fluid line connected between a fuel tank and an engine;
   a tank venting valve arranged along the fluid line; and
   a controller communicatively coupled to the tank venting valve and configured to control the tank venting valve by:
   commissioning of the switch valve while the filter is empty, actuating the tank venting valve using PWM signals with an increasing or decreasing duty cycle;
   determining an opening duty cycle that causes an opening of the tank venting valve based on an increase in an intake pipe pressure; and
   after commissioning the tank valve, actuating the tank venting valve to feed the intake pipe and flush the filter using the determined opening duty cycle to open and close the tank venting valve during active operation of the tank venting valve.

10. The tank venting system of claim 9, wherein the controller is configured to store the determined opening duty cycle in a data storage device.

11. The tank venting system of claim 9, wherein the controller is configured to determine the opening of the tank venting valve by pulse detection.

12. The tank venting system of claim 9, wherein the controller is configured to actuate the tank venting valve based on the opening duty cycle and at least one correction factor selected from the group consisting of pressure difference, battery voltage, and temperature.

* * * * *